United States Patent Office 3,469,869
Patented Sept. 30, 1969

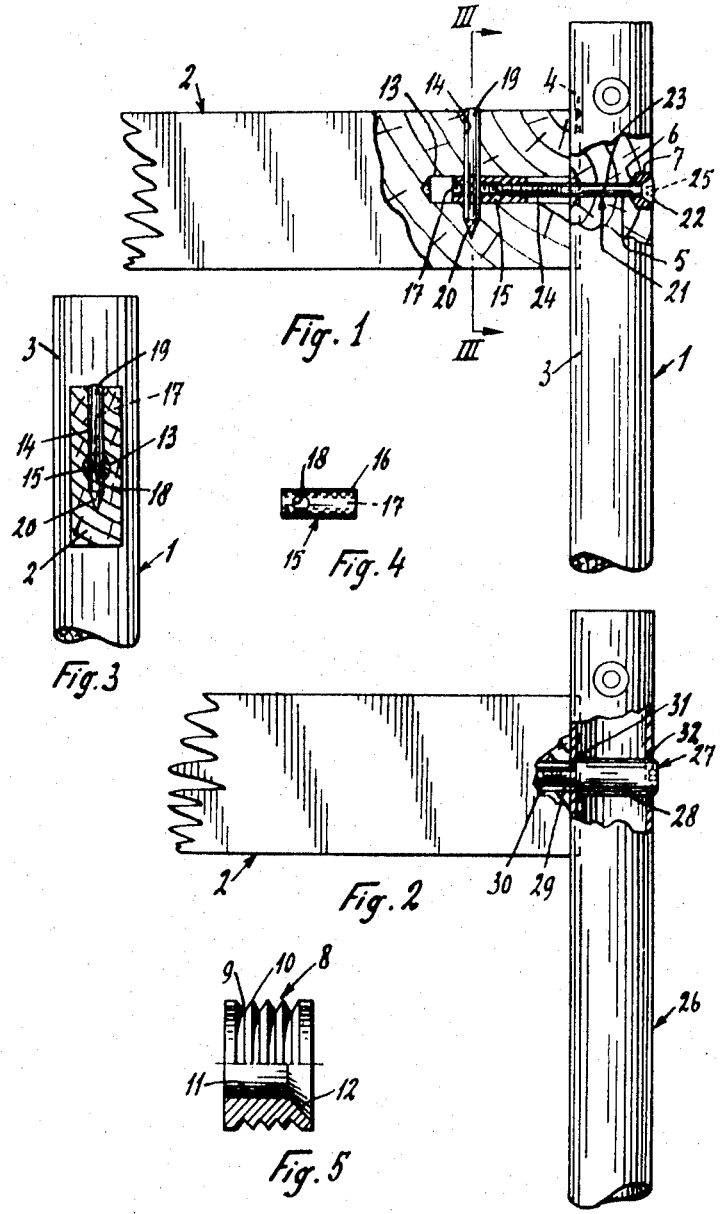

3,469,869
FURNITURE CONNECTING MEANS
Theodoor Hubertus Ramakers, Heerlen, Netherlands, assignor to Meubelindustrie "Thereca" N.V., Kerkrade, Netherlands, a Dutch company
Filed Oct. 31, 1966, Ser. No. 590,815
Claims priority, application Netherlands, Nov. 3, 1965, 6514269
Int. Cl. F16b 7/00; E04g 7/00
U.S. Cl. 287—54                         5 Claims

ABSTRACT OF THE DISCLOSURE

A leg of a piece of furniture is connected to a frame thereof by means of a head bolt which extends through a bore in the leg and is threadably engaged with a tubular nut member secured in a bore in the frame by a transverse pin passing through the nut member and anchored in the frame. A nylon sleeve is inserted into an enlarged portion of the bore in the leg and has an internal shoulder adapted to engage the head of the bolt.

---

The invention relates to furniture connecting means, and in particular to connecting means for attaching a leg to a wooden frame member of a piece of furniture.

According to a recently developed practice, pieces of furniture, such as tables or chairs, are often sold in the form of an assembly kit, comprising various loose parts to be interconnected by the buyer. Since the buyers are generally unskilled, the connecting means must be easy to handle, so that the assembly of the piece of furniture does not involve any difficulties. For this reason, it is impractical to use wood screws to attach the legs of the piece of furniture to the wooden frame member, because the application of wood screws requires a certain carpentering skill.

It has, therefore, been proposed to use a metallic nut member in the frame member and having an internal thread accessible from the outside of the frame member, in combination with a head bolt of which the externally threaded shaft is passed through a bore of the leg and screwed into the nut member. However, in this prior construction, it is still necessary to manipulate the nut member from the outside to bring the thread of the nut member into alignment with the head bolt.

It is an object of the invention to provide improved connecting means for the above-specified purpose, whereby a manipulation of the nut member is rendered unnecessary.

Another object of the invention is to provide improved connecting means for the above-specified purpose, whereby the wooden parts of the piece of furniture are prevented from being damaged by an improper handling of the connecting means.

Further objects of the invention will appear from the following detailed description.

According to the invention, the nut member is formed as a cylindrical sleeve having a coaxial thread in its interior, the sleeve being coaxially disposed in a bore of the frame member, and anchored in said bore by means of a transverse pin extending through corresponding transverse bores of the frame member and the nut member, and secured in at least one of these transverse bores. A bolt extends through a bore in a leg, which is to be attached to the frame member, and the bolt is threadably engaged with the nut member, thereby securing the leg to the frame member.

In a preferred embodiment of the invention, the transverse bore of the frame member extends beyond the nut member, and the transverse pin has a sharply pointed end driven into the wood of the frame member at the bottom of the transverse bore.

In further accordance with the invention, the bore in the leg has an enlarged portion which receives a nylon sleeve in tight engagement, and the head of the bolt contacts an internal shoulder of the nylon sleeve when the bolt is threadably engaged in the nut member.

The invention will be further explained with reference to the accompanying drawing, showing several preferred embodiments thereof.

In the drawing

FIG. 1 shows an elevation view, partly in section, of a first embodiment of the connecting means according to the invention, in assembled condition.

FIG. 2 shows, in similar manner, a second embodiment.

FIG. 3 shows a section along the line III—III in FIG. 1.

FIG. 4 shows a plan view of a threaded sleeve used in both embodiments.

FIG. 5 shows an elevation view, partly in section and on an enlarged scale, of a nylon sleeve used in the embodiment according to FIG. 1.

Referring to FIG. 1, a wooden leg 1, having a circular cross section, is attached to a wooden frame member 2, having a rectangular cross section, in such manner that the cylindrical surface 3 of the leg is pressed against the correspondingly shaped cylindrical end surface 4 of the frame member in an immovable abutting relationship. For this purpose, the leg 1 has been provided with a diametrical bore, comprising a first portion 5 opening on the surface 3 and extending through the major part of the diameter of the leg, and a second portion 7 having a larger diameter and opening on the other side of the leg; the portions 5 and 7 are interconnected by a conical surface 6.

A nylon sleeve 8, shown on an enlarged scale in FIG. 5, has been inserted in the wider bore portion 7. The substantially cylindrical outer surface of the sleeve 8 is provided with peripheral grooves 9 and edges 10; the diameter of the edges 10 has been chosen in such manner that the sleeve fits tightly in the bore portion 7. The central bore 11 of the sleeve 8 has the same diameter as the bore portion 5, and ends in a conical surface 12.

The frame member 2 has a bore 13 perpendicular to the end surface 4, and having a larger diameter than the bore portion 5 of the leg. In addition, the frame member is provided with a transverse bore 14 perpendicular to the bore 13 and having a smaller diameter. The bore 14 opens on one side of the frame member and extends through the major part of its height.

A cylindrical steel sleeve 15 has been inserted in the bore 13. The outside diameter of the sleeve 15 is slightly smaller than the inside diameter of the bore 13, so that the sleeve is easily slidable and rotatable in the bore. The inner surface 17 of the sleeve 15 is provided with an internal thread, which is coaxial with the outer surface 16 of the sleeve. The sleeve 15 is further provided with a continuous transverse bore 18, perpendicular to the axis of the sleeve, and having substantially the same diameter as the transverse bore 14 of the frame member. The transverse bores 14 and 18 are in alignment with each other. It is to be noted that the bore 14 consists of two portions situated above and below the bore 13, respectively.

A transverse pin 19 extends through the transverse bores 14 and 18, and is sharply pointed at its lower end 20. The pin 19 is driven into the wood of the frame member with its end 20 at the bottom of the lower part of the bore 14, whereby the sleeve 15 is anchored in the bore 13.

The leg 1 is attached to the frame member 2 by means of a head bolt 21, having a countersunk head 22, and a shaft 23 provided with an external thread 24. The shaft 23 is passed through the bore of the leg and screwed into the sleeve 15, in such manner that the head 22 engages the conical surface 12 of the nylon sleeve 8. The head 22 is provided with a hexagonal recess 25 into which a correspondingly shaped steel rod may be inserted for tightening the bolt.

If the above-mentioned parts belong to an assembly kit, the steel sleeve 15 and the transverse pin 19 have been inserted in the frame member 2 by the manufacturer, and the pointed end 20 of the pin 19 has been driven into the wood of the frame member at the same time, so that the sleeve 15 is firmly anchored in the bore 13. Likewise, the nylon sleeve 8 has been inserted in the bore portion 7 by the manufacturer. Thus, the only thing that need be done by the buyer to attach the leg 1 to the frame member 2 is to pass the shaft of the head bolt 21 through the bore of the leg and to screw the bolt 21 into the sleeve 15. When the bolt 21 is tightened, the edges 10 of the nylon sleeve grip firmly into the wood of the leg 1, so that the head 22 of the bolt cannot be drawn into the wood.

FIG. 2 shows a modified embodiment, wherein the leg 26 is made of a cylindrical steel tube. The head bolt 27 comprises a cylindrical head 28 the length of which is approximately equal to the diameter of the leg 26. The threaded shaft 29 of the bolt is similar to the threaded shaft 24 of the bolt 21 in FIG. 1. Diametrically opposed holes 31 and 32 have been provided in the wall of the leg 26; the diameter of the hole 31 is substantially equal to that of the shaft 29, and the diameter of the hole 32 is substantially equal to that of the head 28. The leg 26 is attached to the frame member 2 in the same manner as in the embodiment of FIG. 1.

The invention is not restricted to the embodiments shown hereinbefore, which may be modified within the scope of the invention.

I claim:
1. A furniture assembly kit, comprising at least one wooden frame member, a metallic nut member constituted as a cylindrical sleeve having a coaxial internal thread, said sleeve being coaxially disposed in a bore provided in the frame member, a transverse pin extending through corresponding transverse bores provided in the frame member and the nut member, said pin being secured in at least one of said transverse bores to anchor the nut member in said first-mentioned bore in the frame member, at least one head bolt including a shaft portion with an externally threaded part adapted to be screwed into the nut member, at least one wooden leg to be attached to the frame member, said leg being provided with a bore adapted to receive the shaft of said bolt, said bore in the leg having a first portion with a diameter substantially equal to that of the shaft of said bolt, and a second portion with a larger diameter, and a nylon sleeve inserted in the second portion and tightly enclosed thereby, said sleeve having an internal shoulder adapted to engage said bolt at the head thereof.

2. Connecting means for attaching a wooden leg to a wooden frame member of a piece of furniture, said connecting means comprising a metallic nut member constituted as a cylindrical sleeve having a coaxial internal thread, said nut member being coaxially disposed in a bore provided in the frame member, a head bolt including a shaft portion with an externally threaded part adapted to be passed through a bore provided in the leg and screwed into the nut member, a transverse pin extending through corresponding transverse bores provided in the frame member and the nut member, said transverse pin being secured in at least one of said transverse bores and anchoring the nut member in said first mentioned bore of the frame member, said bore in the leg having a first portion with a diameter substantially equal to that of the shaft portion of said bolt, and a second portion with a larger diameter, and a nylon sleeve inserted in the second portion and tightly enclosed thereby, said sleeve having an internal shoulder adapted to engage the said bolt at the head thereof.

3. Connecting means as claimed in claim 2, wherein the transverse bore of the frame member extends beyond the nut member, and the transverse pin has a sharply pointed end driven into the wood of the frame member at the bottom of the transverse bore of the same.

4. Connecting means as claimed in claim 2, wherein the first-mentioned bore and the transverse bore of the frame member intersect each other at right angles.

5. Connecting means as claimed in claim 2, wherein the first portion and the second portion of the bore of the leg are interconnected by a conical portion.

References Cited

UNITED STATES PATENTS

| | | |
|---|---|---|
| 103,511 | 5/1870 | Sheaffer. |
| 1,734,340 | 11/1929 | Overton. |
| 2,678,585 | 5/1954 | Ellis. |
| 2,802,503 | 8/1957 | Zupa. |
| 2,815,972 | 12/1957 | Lagervall. |
| 3,008,552 | 11/1961 | Cushman et al. _____ 16—2 XR |

FOREIGN PATENTS

| | | |
|---|---|---|
| 173,307 | 2/1935 | Switzerland. |
| 445,247 | 4/1936 | Great Britain. |
| 319,495 | 4/1957 | Switzerland. |
| 563,853 | 1/1958 | Belgium. |

DAVID S. WILLIAMOWSKY, Primary Examiner

ANDREW V. KUNDRAT, Assistant Examiner

U.S. Cl. X.R.

5—298; 287—20.92